United States Patent
Jeanes et al.

(10) Patent No.: US 6,734,279 B2
(45) Date of Patent: May 11, 2004

(54) TWO STEP PRODUCTION OF POLYCARBONATES

(75) Inventors: Thomas O. Jeanes, Antioch, CA (US); John Osby, Lake Jackson, TX (US)

(73) Assignee: Generon IGS, Inc., Houston, TX (US)

( * ) Notice: Subject to any disclaimer, the term of this patent is extended or adjusted under 35 U.S.C. 154(b) by 0 days.

(21) Appl. No.: 10/289,537

(22) Filed: Nov. 5, 2002

(65) Prior Publication Data

US 2003/0162653 A1 Aug. 28, 2003

Related U.S. Application Data

(60) Provisional application No. 60/332,913, filed on Nov. 5, 2001.

(51) Int. Cl.$^7$ .............................. C08G 64/00
(52) U.S. Cl. .............................. 528/196; 528/198
(58) Field of Search ............................. 528/196, 198

(56) References Cited

U.S. PATENT DOCUMENTS 5,274,068 A * 12/1993 Boden et al. ............... 528/179

* cited by examiner

*Primary Examiner*—Terressa Boykin
(74) *Attorney, Agent, or Firm*—William H. Eilberg

(57) ABSTRACT

Methods of synthesizing high molecular weight polycarbonate polymers are described. Also described are polycarbonates produced by these methods.

31 Claims, No Drawings

TWO STEP PRODUCTION OF POLYCARBONATES

CROSS-REFERENCE TO RELATED APPLICATION

This application is related to provisional patent application Ser. No. 60/332,913, filed Nov. 5, 2001, from which priority is claimed under 35 USC §119(e)(1) and which is incorporated herein by reference in its entirety.

FIELD OF THE INVENTION

The present invention relates to polycarbonates and methods of producing these polycarbonates. More particularly, it relates to production and use of high molecular weight polycarbonates.

BACKGROUND

Polycarbonates are amorphous thermoplastic materials that typically exhibit extremely high impact strength coupled with excellent clarity, as well as relatively high continuous use temperatures (250° F.). Polycarbonates have been used in a wide range of applications (e.g., the production of membrane filters), and in many of these application it is preferable to use high molecular weight polycarbonates.

Polycarbonates are typically produced by phosgenation of bisphenols. (See, e.g., U.S. Pat. No. 3,912,687; and U.S. Pat. Nos. 2,970,131; 4,262,113; 4,286,086; and 4,291,151). In some synthetic methods, substituted and/or activated pyridine catalysts have been used to produce polycarbonates from bisphenol A. (See, e.g., U.S. Pat. No. 4,286,085; U.S. Pat. No. 4,794,156 and U.S. Pat. No. 3,530,094). Additionally, U.S. Pat. No. 5,804,525 discloses the production of polycarbonates from certain bisphenols using TEA catalysts.

However, none of these processes reliably and efficiently produce high molecular weight polycarbonates, particularly when synthesizing polycarbonates from bulky (or sterically hindered) bisphenols or bisphenols that are poor nucleophiles. Even polymerization accomplished in the presence of an activated pyridine catalyst, yield polycarbonates having lower than desired molecular weights. (See, U.S. Pat. No. 4,794,156).

Thus, there remains a need for methods of producing high molecular weight polycarbonates from polyhalobisphenols and compositions comprising these polycarbonates.

SUMMARY OF THE INVENTION

The present invention provides novel methods of synthesizing high molecular weight polycarbonates, wherein the polycarbonates have a high weight average molecular weight and, preferably, relatively low polydispersity. The methods comprise reacting bisphenol with at least two different catalysts. The first catalyst comprises at least one phase transfer catalyst (PTC) and the second catalyst comprises at least one activated pyridine.

Thus, in one aspect, the invention relates to a method for synthesizing polycarbonates, the method comprising the steps of:
  (a) mixing a bisphenol with at least one phase transfer catalyst;
  (b) adding phosgene to the mixture of step(a);
  (c) adding a catalytic amount of an activated pyridine, thereby producing said polycarbonate; and
  (d) recovering said high molecular weight polycarbonate.

In another aspect, the invention relates to a method for synthesizing a polycarbonate having a molecular weight over 150,000, the method comprising the steps of:
  (a) mixing a bisphenol with a phase transfer catalyst and with sufficient caustic solution to maintain an alkaline pH in the range of about 7.5 to 11;
  (b) adding phosgene to said mixture and maintaining the pH in the range of about 7.5 to 11;
  (c) adding a catalytic amount of an activated pyridine catalyst, thereby producing said high molecular weight polycarbonate; and
  (d) recovering said polycarbonate.

In another aspect, the invention relates to a method for synthesizing a polycarbonate having a molecular weight over 150,000, the method comprising the steps of:
  (a) mixing a bisphenol with a phase transfer catalyst and a molecular weight modifier;
  (b) adjusting the pH of the mixture of step(a) to an alkaline pH in the range of about 7.5 to 11;
  (c) adding phosgene to said mixture, while maintaining the pH in the range of about 8.0 to 10;
  (d) adding a catalytically effective amount of an activated pyridine catalyst;
  (e) adjusting the pH of the solution to about 7.0; and
  (e) recovering said high molecular weight polycarbonate.

In any of the methods described herein, the bisphenol preferably comprises a halobisphenol (e.g., 9,9-bis-(3,5-dibromo-4-hydroxyphenyl)fluorene); the weight average molecular weight of the resulting polycarbonate is preferably greater than about 150,000; and the polydispersity of the polycarbonate is preferably less than about 12. Furthermore, in any of these methods, the solvent is preferably a halogenated solvent, such as methylene chloride. In certain embodiments, one phase transfer catalyst (e.g., benzyltriethylammonium chloride, tetrabutylammonium hydroxide, etc.) is mixed with bisphenol, while in other embodiments, two or more PTCs are mixed with bisphenol. Preferably, the ratio of bisphenol to each PTC is between about 90:1 and 200:1. Similarly, in preferred embodiments, the mole ratio of bisphenol to phosgene is between about 0.30 and 0.40.

In any of the methods described herein, a molecular weight modifier can be used, for example, a phenol such as para-tertiary butyl phenol can be added to the bisphenol-PTC mixture. In preferred embodiments, between about 0.10 to 8 mole % of molecular weight modifier based on the total moles of bisphenol is added.

In certain embodiments, the activated pyridine comprises dimethylamino pyridine. Preferably, the catalyst ratio of PTC to activated pyridine is between about 2.5:1 and about 15:1 (or any value therebetween), even more preferably between about 3:1 and 11:1 and even more preferably between about 4:1 and 5:1

In still further aspects of the invention, high weight average molecular weight polycarbonates produced by any of the methods described herein are provided.

These and other embodiments of the subject invention will readily occur to those of skill in the art in light of the disclosure herein.

DESCRIPTION OF THE INVENTION

Methods of preparing high molecular weight polycarbonates using two or more catalysts during the polymerization process are described. In particular, one catalyst, the phase transfer catalyst (PTC), facilitates the growth of monobischloroformate to a chloroformate terminated multimer. The second catalyst, dimethylaminopyridine (DMAP) facilitates the final coupling and allows for formation of higher weight average molecular weight products. Compositions comprising polycarbonates produced by these methods as well as methods of using these compositions also form aspects of this invention.

The practice of the present invention will employ, unless otherwise indicated, conventional techniques of chemistry and engineering which are within the skill of the art. Such techniques are explained fully in the literature. See, e.g., Kesting, R. E., *Synthetic Polymeric Membranes*, John Wiley & Sons, $2^{nd}$ Ed. (1985); Hwang, Sun-Tak and Kammermeyer, Karl, *Membranes in Separation*, Robert E. Kriegar Publishing Co., Inc., (1984). Although a number of compositions and methods similar or equivalent to those described herein can be used in the practice of the present invention, the preferred materials and methods are described.

All publications, patents and patent applications cited herein, whether above or below, are hereby incorporated by reference in their entirety.

It must be noted that, as used in this specification and the appended claims, the singular forms "a", "an", and "the" include plural referents unless the content clearly dictates otherwise. Thus, for example, reference to "a polycarbonate" includes a mixture of two or more such polycarbonates and the like.

The present invention provides a method for preparing high weight average molecular weight polycarbonates. The methods described herein can be used to synthesize polycarbonate from virtually any bisphenol, including, for the first time, hindered bisphenols. Polyhalobisphenols are described, for the example in U.S. Pat. No. 3,912,687. Suitable bisphenols are known and are commercially available, for example, from Dow Chemical Company; Great Lakes Chemical Company. However, unlike previous methods, the processes described herein are also useful with bulky bisphenols, for example 9,9-bis-(3,5-dibromo-4-hydroxyphenyl)fluorene (TBBHPF).

Polycarbonates produced by these methods are useful in a variety of applications. For instance, polycarbonate gas separation membranes exhibit improved flux and selectivity as well as stability when the polycarbonate components have relatively high molecular weights and/or relatively low polydispersities. Polydispersity is defined as the ratio of weight average of molecular weight (Mw) to number average of molecular weight (Mn). In preferred embodiments, the polycarbonate polymers have weight average molecular weights between about 100,000 and 700,000 (or any integer value therebetween); more preferably between about 150,000 and 700,000 (or any integer value therebetween); more preferably between about 200,000 and 600,000 (or any integer value therebetween) and even more preferably between about 200,000 and 500,000 (or any integer value therebetween). Similarly, the polycarbonate polymers preferably have a polydispersity less than about 15, more preferably less than about 12; even more preferably less than about 6. Thus, the methods described herein allow for the routine and efficient synthesis of high weight average molecular weight polycarbonate polymers useful in production of gas separation membranes.

As noted above, the methods described herein involve the use of two or more catalysts, preferably contacted with the bisphenol sequentially. First, the bisphenol-containing preparation is contacted with at least one phase transfer catalyst (PTC) that facilitates the production of halogen-terminated molecules, for example conversion of monobischloroformate species to chloroformate terminated multimers. The term "multimer" refers to any oligomeric compound or molecule comprising two or more components. Non-limiting examples of oligomeric compounds or molecules include hetero- or homo-dimers, trimers, pentamers, hexamers, heptamers, octamers and the like. Further, the multimers and/or components of the multimers may, for example, be an active species.

Any suitable PTCs can be used, for examples as described in U.S. Pat. Nos. 5,804,525 and 5,426,170. In one preferred embodiments, a single PTC catalyst is used, for example, benzyltriethylammonium chloride (BTEAC). In other embodiments, two PTC catalysts are used, for example, (BTEAC) and tetrabutylammonium hydroxide (TBAH). Other exemplary catalysts include tetramethyl ammonium hydroxide (TMAH); tetraethyl ammonium hydroxide (TEAH); methyl tributyl ammonium hydroxide (MTBAH); and benzyl trimethyl ammonium hydroxide (BTMAH). Other suitable PTCs can be readily tested and used following the teachings of this specification.

Thus, a mixture comprising bisphenol and a PTC is provided. In preferred embodiments, the bisphenol/PTC reaction mixture contain at least one molecular weight modifier, for example, a monofunctional phenol such as para-tertiary-butyl phenol. The proportion of molecular weight modifier will depend on various factors including the purity of the monomer, reaction conditions and the like. In certain embodiments, the proportion of molecular weight modifier is preferably between about 0.10 to 8 mole % based on the total moles of bisphenol. Other non-limiting examples of suitable molecular weight modifiers include phenol, t-butyl phenol, p-cumyl phenol and the chloroformates of these phenols.

Suitable mole ratios of the various components (e.g., bisphenol, PTC, molecular weight modifiers, etc.) can be readily determined following the teachings herein. In certain embodiments, the ratio of bisphenol to each PTC is between about 50:1 and 600:1 (or any integer therebetween). In preferred embodiments, the ratio of bisphenol to each PTC is between about 90:1 and 200:1 (or any integer therebetween). The ratio may be different for each PTC employed in the methods. However, a preferred range for each first catalyst ranges of from about 0.1 to 0.7 mole % based on the total moles of bisphenol. Similarly, the quantity of molecular weight modifier ranges from about 0.01 to 6.00 mole % based on the moles of bisphenol present in the reaction medium, a more preferred range is 0.1 to 2.00 mole %, and the most preferred range is 0.20 to 0.70 mole %.

Suitable organic solvents which can be used are, for example, chlorinated aliphatic hydrocarbons, such as methylene chloride, chloroform, carbon tetrachloride, dichloroethane, trichloroethane, tetrachloroethane, dichloropropane and 1,2-dichloroethylene; substituted aromatic hydrocarbons such as, chlorobenzene, o-dichlorobenzene, and the various chlorotoluenes. The chlorinated aliphatic hydrocarbons, especially methylene chloride, are preferred.

The PTC(s) can be added to the reaction mixture prior to, concurrently or subsequent to bisphenol and the other additional components (e.g., molecular weight modifier(s), phosgene, etc.). In preferred embodiments, the at least one PTC is added to the reaction mixture prior to both phosgene and activated pyridine.

In a preferred form of the present invention, the bisphenol/PTC mixture is then phosgenated. Phosgene ($COCl_2$) also called carbonyl chloride, has long been used in synthesis of polycarbonates and is commercially available from a variety of sources. It will be readily apparent from the present specification what amount (or mole ratio) of phosgene to employ. For example, in preferred embodiments the mole ratio of phosgene to bisphenol is between about 2.0 to about 4.0 (or any value therebetween), more preferably between about 2.5 to about 3.3 (or any value therebetween).

Phosgenation of the bisphenol can be conducted in a wide variety of either batch or continuous reactors. Such reactors are, for example, stirred tank reactors, which may be either batch or continuous flow. Additional reactors which are included are agitated column and recirculating loop continuous reactors. Furthermore, during phosgenation, the mixture is optionally agitated, such as, by using a stirrer or other conventional equipment. The phosgenation rate can vary from between about 0.02–0.2 mol of phosgene, per mol of bisphenol per minute.

The phosgenated PTC/bisphenol mixture is contacted with an activated pyridine catalyst. In a preferred embodiment, the activated pyridine comprises dimethylaminopyridine (DMAP). (See, e.g., U.S. Pat. No. 4,794,156). Preferably, the catalyst ratio of PTC to activate pyridine is between about 2.5:1 and about 15:1 (or any value therebetween), even more preferably between about 3:1 and 11:1 and even more preferably between about 4:1 and 5:1. (See, Examples). It may be preferable to use lower catalyst ratios (e.g., between about 4:1 and 5:1) to facilitate removal of residual PTC from the final polymer solution.

It is desirable to include a pH probe and/or thermometer in the reaction vessel at one or more steps of the methods so that pH and temperature can be monitored and or adjusted to desired levels. For example, in certain embodiments, the pH of the bisphenol preparation is optionally adjusted at one or more times during the synthetic method. Generally, the set pH will depend upon the pKa of the bisphenol species being used. In one embodiment, the pH is adjusted prior to addition of the activate pyridine catalyst. Further, a wide range of pHs may be tolerated, although generally neutral to alkaline is preferable. In certain embodiments, the pH is adjusted to between about 8.0 and 9.0 prior to addition of phosgene; adjusted to about 8.0 after addition of phosgene; and adjusted to about 7.0 after addition of the activated pyridine catalyst and upon completion of the polymerization. The pH can be adjusted using any suitable method, for example by adding sufficient acidic or alkaline materials. Non-limiting examples of acidic materials include hydrochloric acid (HCl). Non-limiting examples of alkaline materials include alkali metal hydroxide, aqueous alkali or alkaline earth metal hydroxide. Some of the alkali metal or alkaline earth metal hydroxides, which can be employed are for example, sodium hydroxide, potassium hydroxide, and calcium hydroxide.

Reaction temperatures can be in the range up to the boiling point of the solvent being used. Typically, the reaction temperature will be between about 5° C. to about 50° C., or any value therebetween. The reaction can be conducted at atmospheric pressures, although sub- or super-atmospheric pressures may be employed if desired. Similarly, the reaction vessel can be purged at any time during polycarbonate synthesis, for example with an inert gas such as nitrogen.

Polycarbonate recovery can be achieved by standard techniques, such as precipitation, filtration, decantation, centrifugation, and the like. Characterization of the polymer can also be achieved by standard techniques, for example size exclusion chromatography (SEC).

It will be apparent to those skilled in the art that, although the methods described herein are exemplified in laboratory scale, these methods can be readily scaled up to commercial or large-scale conditions.

The polycarbonates of the present invention can be incorporated into any known membrane device, for example plate and frame, spiral-wound, or hollow fiber devices. Methods of fabricating such devices are known in the art. In addition, the membranes may be further surface-modified, for example as described in U.S. Pat. No. 6,156,381.

The following examples are illustrative in nature, and are not intended to limit the scope of the present invention in any manner.

EXAMPLES

Example 1

To a two liter round bottom flask equipped with a stirrer, pH probe, thermometer, caustic trap and sparge or induction tube was added 100 grams (0.1502 moles) of 9,9-bis-(3, 5dibromo-4-hydroxyphenyl)fluorene (TBBHPF), 682.3 mg (0.0030 moles–2 mole %) of benzyltriethylammonium chloride (BTEAC) and 109.8 mg (0.0007 moles–0.49 mole %) of para-tertiary butyl phenol. To the reactor was added 485 milliliters of methylene chloride, a portion of which was used to rinse the addition funnel. This was followed by the addition of 600 milliliters of distilled water. The stirrer was started and the slurry was purged with nitrogen for 15 minutes. The initial pH of the solution was 5.5; the pH setpoint was adjusted to 9.5 and the caustic pump was turned on. The pH rose to about 10.0 with addition of caustic (25% solution w/w) but the appearance of the slurry with two distinct phases with a slight rag layer remained unchanged.

Phosgene (Matheson Gas, 39 grams–0.394 moles–262.6 mole %) was added slowly over the period of 60 minutes; the temperature rose from 18° C. to 24° C. with a final pH of about 9.0 to 9.5. The pH setpoint was lowered to about 8.5 and the stirring speed was then increased; about 73.5 mg of dimethylaminopyridine (0.0006 moles–0.4 mole %) was added to the flask and the funnel was rinsed with about 100 mL of methylene chloride. During the polymerization stage, additional caustic solution (25% w/w solution) was added to the mixture by demand based upon the pH set point. The phase inversion was complete in about 12 minutes and the pH rose to about 10.0. The pH probe was removed from the flask and rinsed to remove polymer residue. The probe was returned to the flask and a total of 10 mL of concentrated HCl was added to the stirred mixture in 1 mL aliquots, an amount necessary to drive the pH to about 7.0. The aqueous layer was decanted and 500 mL of 1 N HCl was added to the flask. The mixture was stirred for about 10 minutes and then allowed to separate. The aqueous layer was once again decanted and 500 mL of distilled water was added to the flask. The mixture was stirred again for 10 minutes and allowed to separate. The aqueous layer was again decanted and the water wash was repeated. Sequentially, the second water wash was followed by a 1 N sodium carbonate wash and two additional water washes. The solution was transferred to a separatory funnel. The solution was then transferred to a graduated cylinder (600 mL total). The polymer was precipitated by dribbling the methylene chloride solution into a bucket containing 1.2 L of heptane that is being stirred at a very rapid rate. The polymer was recovered by filtration and dried in a forced air oven at 100° C. for 16 hours.

The polymer was characterized using size exclusion chromatography (SEC). The columns were calibrated using two sets of narrow polystyrene standards and a broad polycarbonate standard. The sample was found to have a weight average molecular weight (Mw) of 337,691; number average molecular weight (Mn) of 29,622; and a polydispersity (Mw/Mn) of 11.4

Example 2

To a one liter round bottom flask equipped with a stirrer, pH probe, thermometer, caustic trap and sparge or induction tube was added 50.27 grams (0.0755 moles) of 9,9-bis (3,5-dibromo-4-hydroxyphenyl)fluorene (TBBHPF), 174.6 mg (0.0007 moles–1 mole %) of benzyltriethylammonium chloride (BTEAC), 205.7 mg (0.0007 moles–1 mole %) of tetrabutylammonium hydroxide (TBAH) and 55.5 mg (0.00037 moles–0.49 mole %) of para-tertiary butyl phenol. To the reactor was added 290 milliliters of methylene and 400 mL of distilled water. The stirrer was started and the slurry was purged with nitrogen for 30 minutes. The initial pH of the solution was 5.5; the pH setpoint was adjusted to 9.0 and the caustic pump was turned on. The pH rose to about 9.5 with the addition of caustic solution (25% solution w/w). Phosgene (22 grams–0.222 moles–294.6 mole %) was added slowly over the period of 25 minutes; the temperature rose from 18° C. to 25.1° C. with a final pH of about 9.0. The mixture was frothy at one point and upon completion, the aqueous phase was clear while the organic phase was milky. The pH setpoint was lowered to about 8.0 and the stirring speed was then increased; about 36.6 mg of dimethylaminopyridine (0.0003 moles–0.4 mole %) was added to the flask and the funnel was rinsed with about 25 mL of methylene chloride. During the polymerization stage, additional caustic solution (25% w/w solution) was added to the mixture by demand based upon the pH set point.

The phase inversion was complete in about 105 minutes, the temperature rose from 23.0° C. to about 26.0° C. and the pH rose to about 10.0. The organic phase was very viscous. The pH probe was removed from the flask and rinsed to remove polymer residue. The probe was returned to the flask and aliquots of 1 N HCl were added to the stirred until the pH was approximately 7.0. The mixture was then washed as before with 300 mL volumes of 1 N HCl, water, 1 N sodium carbonate and water. The methylene chloride solution was transferred to a separatory funnel and precipitated as before in 1 liter of heptane. The polymer was found to have a weight average molecular weight (Mw) of 339,632; a number average molecular weight (Mn) of 51,295 and a polydispersity of about 6.6.

Example 3

To a one liter round bottom flask equipped with a stirrer, pH probe, thermometer, caustic trap and sparge or induction tube was added 50.08 grams (0.0752 moles) of 9,9-bis (3,5-dibromo-4-hydroxyphenyl)fluorene (TBBHPF), 168.9 mg (0.0008 moles–1.1 mole %) of benzyltriethylammonium chloride (BTEAC) and 65.1 mg (0.00043 moles–0.58 mole %) of para-tertiary butyl phenol. To the reactor was added 300 milliliters of methylene chloride and 350 mL of distilled water. The stirrer was started and the slurry was purged with nitrogen for 20 minutes. The initial pH of the solution was 5.5; the pH setpoint was adjusted to 8.5 and the caustic pump was turned on. The pH rose to about 10.6 with the addition of caustic (25% solution w/w). Phosgene (17.4 grams–0.176 moles–234.0 mole %) was added slowly over the period of 19 minutes; the temperature was controlled from 21.1° C. to 24.3° C. with a final pH of about 8.1. The mixture was turbid at the beginning and upon completion, the aqueous phase was clear while the organic phase was semi-clear. The pH setpoint was lowered to about 8.0 and the stirring speed was then increased. Stirring was continued for about 21 minutes before about 36.6 mg of dimethylaminopyridine (0.0003 moles–0.4 mole %) was added to the flask and the funnel was rinsed with about 25 mL of methylene chloride. During the polymerization stage, additional caustic solution (25% w/w solution) was added to the mixture by demand based upon the pH set point.

The phase inversion was complete in about 33 minutes, the temperature rose from 24.3° C. to about 32.1° C. and the pH rose to final value of about 10.3. The organic phase was very viscous. The pH probe was removed from the flask and rinsed to remove polymer residue. The probe was returned to the flask and the aqueous layer was acidified to a pH of about 7.5 before being removed. The mixture was washed twice with 300 mL volumes of 1N HCl, followed by three water washes. The final pH was between about 3 and 4. The solution was then water washed twice with 300 mL volumes. The methylene chloride solution was transferred to a separatory funnel and precipitated as before in 1 liter of heptane. The polymer was found to have a weight average molecular weight (Mw) of 181,375; a number average molecular weight (Mn) of 47,124 and a polydispersity of about 3.85.

Example 4

To a one liter round bottom flask equipped with a stirrer, pH probe, thermometer, caustic trap and sparge or induction tube was added 50.07 grams (0.0752 moles) of 9,9-bis (3,5-dibromo-4-hydroxyphenyl)fluorene (TBBHPF), 103.8 mg (0.0005 moles–0.6 mole %) of benzyltriethylammonium chloride (BTEAC) and 41.1 mg (0.00027 moles–0.36 mole %) of para-tertiary butyl phenol. To the reactor was added 300 milliliters of methylene chloride and 300 mL of distilled water. The stirrer was started and the slurry was purged with nitrogen for 20 minutes. The initial pH of the solution was 5.5; the pH setpoint was adjusted to 8.5 and the caustic pump was turned on. The pH rose to about 9.0 with the addition of caustic (25% solution w/w). Phosgene (20.0 grams–0.193 moles–256.8 mole %) was added slowly over the period of 18 minutes; the temperature rose from 18.0° C. to 24.6° C. with a final pH of about 10.0. The mixture was turbid at the beginning and upon completion, the aqueous phase was clear while the organic phase was semi-clear. The pH setpoint was lowered to about 8.0 and the stirring speed was then increased; about 36.6 mg of dimethylaminopyridine (0.0003 moles–0.4 mole %) was added to the flask and the funnel was rinsed with about 25 mL of methylene chloride. During the polymerization stage, additional caustic solution (25% solution w/w) was added to the mixture by demand based on the pH setpoint.

The phase inversion was complete in about 20 minutes, the temperature rose from 18.1° C. to about 24.6 C. and the pH rose to about 9.8. The organic phase was very viscous. The pH probe was removed from the flask and rinsed to remove polymer residue. The probe was returned to the flask and the aqueous layer was removed. The mixture was washed twice with 300 mL volumes of 1 N HCl, followed by three water washes. The final pH was between about 3 and 4. The methylene chloride solution was transferred to a separatory funnel and precipitated as before in one liter of heptane. The polymer was found to have a weight average molecular weight (Mw) of 467,507; a number average molecular weight (Mn) of 74,483 and a polydispersity of about 6.3.

Modifications of the procedure and device described above, and the methods of using them in keeping with this invention will be apparent to those having skill in this mechanical and technical art. These variations are intended to be within the scope of the disclosure.

What is claimed is:

1. A two-step method for producing a high molecular weight polycarbonate, the method comprising: reacting a bisphenol and a phase transfer catalyst with a carbonate precursor; and adding an aromatic amine to produce the high molecular weight polymer, wherein the adding step is distinct from, and is performed after, the reacting step.

2. The method of claim 1, wherein the bisphenol is a sterically hindered bisphenol.

3. The method of claim 2, wherein the bisphenol is 9,9-bis-(3,5-dibromo-4- -hydroxyphenyl)fluorene.

4. The method of claim 1, wherein the phase transfer catalyst is selected from the group consisting of benzyltriethylammonium chloride (BTEAC), tetrabutylammonium hydroxide (TBAH), tetramethyl ammonium hydroxide (TMAH), tetraethyl ammonium hydroxide (TEAH), methyl tributyl ammonium hydroxide (MTBAH), and benzyl trimethyl ammonium hydroxide (BTMAH).

5. The method of claim 4, wherein the phase transfer catalyst is BTEAC.

6. The method of claim 1, wherein the phase transfer catalyst is BTEAC and THAH.

7. The method of claim 1, wherein the carbonate precursor is phosgene.

8. The method of claim 1, wherein the aromatic amine is an activated pyridine.

9. The method of claim 8, wherein the activated pyridine is dimethylaminopyridine.

10. The method of claim 1, wherein the aromatic amine is added at a pH of about 7.0.

11. The method of claim 1, further comprising recovering the high molecular weight polycarbonate.

12. A two-step method for producing a high molecular weight polycarbonate, the method comprising: reacting a sterically hindered bisphenol and benzyltriethylammonium chloride and optionally tetrabutylammonium hydroxide with phosgene; adding dimethylaminopyridine to produce the high molecular weight polymer, the adding step being distinct from, and being performed after, the reacting step; and recovering the high molecular weight polycarbonate.

13. The method of claim 12, wherein the sterically hindered bisphenol is 9,9-bis-(3,5-dibromo-4-hydroxyphenyl)fluorene.

14. The method of claim 12, wherein benzyltriethylammonium chloride and dimethylaminopyridine are in a mole ratio of about 2.5:1 to about 15:1.

15. The method of claim 12, wherein the high molecular weight polycarbonate has a molecular weight greater than about 150,000.

16. A catalyst composition to catalyze the production of high molecular weight polycarbonates, the composition comprising a mixture of at least two catalysts wherein a first catalyst is a phase transfer catalyst selected from the group consisting of benzyltriethylammonium chloride (BTEAC), tetrabutylammonium hydroxide (TBAH), tetramethyl ammonium hydroxide (TMAH), tetraethyl ammonium hydroxide (TEAH), methyl tributyl ammonium hydroxide (MTBAH), and benzyl trimethyl ammonium hydroxide (BTMAH), and a second catalyst is an aromatic amine.

17. The composition of claim 16, wherein the mole ratio of the first catalyst to the second catalyst is about 2.5:1 to about 15:1.

18. The composition of claim 16, wherein the first catalyst is BTEAC.

19. The composition of claim 16, wherein the first catalyst is BTEAC and TBAH.

20. The composition of claim 16, wherein the aromatic amine is dimethylaminopyridine.

21. A method for producing a high molecular weight polycarbonate, the method comprising: reacting a bisphenol and a phase transfer catalyst with a carbonate precursor; and adding an aromatic amine to produce the high molecular weight polymer,
wherein the bisphenol is a sterically hindered bisphenol, and wherein the bisphenol is 9,9-bis-(3,5-dibromo-4- -hydroxyphenyl)fluorene.

22. A method for producing a high molecular weight polycarbonate, the method comprising: reacting a bisphenol and a phase transfer catalyst with a carbonate precursor; and adding an aromatic amine to produce the high molecular weight polymer,
wherein the phase transfer catalyst is selected from the group consisting of benzyltriethylammonium chloride (BTEAC), tetrabutylammonium hydroxide (TBAH), tetramethyl ammonium hydroxide (TMAH), tetraethyl ammonium hydroxide (TEAH), methyl tributyl ammonium hydroxide (MTBAH), and benzyl trimethyl ammonium hydroxide (BTMAH).

23. The method of claim 22, wherein the phase transfer catalyst is BTEAC.

24. A method for producing a high molecular weight polycarbonate, the method comprising: reacting a bisphenol and a phase transfer catalyst with a carbonate precursor; and adding an aromatic amine to produce the high molecular weight polymer,
wherein the phase transfer catalyst is BTEAC and TMAH.

25. A method for producing a high molecular weight polycarbonate, the method comprising: reacting a sterically hindered bisphenol and benzyltriethylammonium chloride and optionally tetrabutylammonium hydroxide with phosgene; adding dimethylaminopyridine to produce the high molecular weight polymer; and recovering the high molecular weight polycarbonate,
wherein the sterically hindered bisphenol is 9,9-bis-(3,5-dibromo-4-hydroxyphenyl)fluorene.

26. A method for producing a high molecular weight polycarbonate, the method comprising: reacting a sterically hindered bisphenol and benzyltriethylammonium chloride and optionally tetrabutylammonium hydroxide with phosgene; adding dimethylaminopyridine to produce the high molecular weight polymer; and recovering the high molecular weight polycarbonate,
wherein benzyltriethylammonium chloride and dimethylaminopyridine are in a mole ratio of about 2.5:1 to about 15:1.

27. A two-step method for producing a high molecular weight polycarbonate, the method comprising: reacting a bisphenol and a phase transfer catalyst with a carbonate precursor; and adding a catalytic amount of an activated pyridine to produce said polycarbonate, wherein the adding step is distinct from, and is performed after, the reacting step.

28. The method of claim 27, wherein the carbonate precursor is phosgene.

29. The method of claim 28, wherein the reacting step includes providing sufficient caustic solution to maintain an alkaline pH in a range of about 7.5 to 11.

30. The method of claim 1, wherein the reacting step is performed with at least two phase transfer catalysts.

31. The composition of claim 16, wherein the first catalyst includes at least two phase transfer catalysts.

* * * * *